United States Patent
Iwasaki et al.

(10) Patent No.: US 8,949,524 B2
(45) Date of Patent: *Feb. 3, 2015

(54) SAVING LOG DATA USING A DISK SYSTEM AS PRIMARY CACHE AND A TAPE LIBRARY AS SECONDARY CACHE

(71) Applicant: International Business Machines Corporation, Armonk, NY (US)

(72) Inventors: Norie Iwasaki, Fujisawa (JP); Koichi Masuda, Yokohama (JP); Tadaaki Minoura, Yamato (JP); Tomokazu Nakamura, Kawasaki (JP); Takeshi Sohda, Sagamihara (JP); Takahiro Tsuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,435

(22) Filed: Sep. 17, 2013

(65) Prior Publication Data

US 2014/0019682 A1 Jan. 16, 2014

Related U.S. Application Data

(63) Continuation of application No. 12/966,046, filed on Dec. 13, 2010, now Pat. No. 8,543,760.

(51) Int. Cl.
*G06F 12/02* (2006.01)
*G06F 12/08* (2006.01)
(Continued)

(52) U.S. Cl.
CPC .......... *G06F 12/0866* (2013.01); *G06F 3/0619* (2013.01); *G06F 3/0649* (2013.01); *G06F 3/0685* (2013.01); *G06F 3/0686* (2013.01); *G06F 11/0727* (2013.01); *G06F 11/0787* (2013.01); *G06F 12/08* (2013.01)
USPC ........................................... 711/113; 711/161

(58) Field of Classification Search
USPC .................................................. 711/113, 161
See application file for complete search history.

(56) References Cited

U.S. PATENT DOCUMENTS

2001/0042222 A1 11/2001 Kedem et al.
2006/0206665 A1 9/2006 Orsley
(Continued)

FOREIGN PATENT DOCUMENTS

JP 2007199754 A 8/2007

OTHER PUBLICATIONS

Zhang et al., HPTFS: A High Performance Tape File System, May 2006, Proceedings of 14th NASA Goddard/23rd IEEE conference on Mass Storage System and Technologies.

*Primary Examiner* — Jared Rutz
(74) *Attorney, Agent, or Firm* — Griffiths & Seaton PLLC (57) ABSTRACT

Various embodiments are provided for saving a log data in a hierarchical storage management system using a disk system as a primary cache with a tape library as a secondary cache. The user data is stored in the primary cache and written into the secondary cache at a subsequent period of time. Blank tapes in the secondary cache is prepared for storing the user data and the log data based on priorities. At least one of the blank tapes is selected for copying the log data and the user data from the primary cache to the secondary cache based on priorities. The log data is stored in the primary cache. The selection of at least one of the blank tapes completely filled with the log data is delayed for writing additional amounts of the user data.

14 Claims, 7 Drawing Sheets

(51) Int. Cl.
*G06F 3/06* (2006.01)
*G06F 11/07* (2006.01)

(56) References Cited

U.S. PATENT DOCUMENTS

2008/0162594 A1 7/2008 Poston
2011/0225123 A1 9/2011 D'Souza et al.

FIG. 6

SAVING LOG DATA USING A DISK SYSTEM AS PRIMARY CACHE AND A TAPE LIBRARY AS SECONDARY CACHE

CROSS-REFERENCE TO RELATED APPLICATIONS

This application is a Continuation of U.S. patent application Ser. No. 12/966,046, filed on Dec. 13, 2010, now U.S. Pat. No. 8,543,760.

BACKGROUND OF THE INVENTION

1. Field of the Invention

The present invention relates in general to computers, and more particularly to method embodiments for saving log data in a hierarchical storage management (HSM) system using a disk system as a primary cache with a tape library as a secondary cache in a computing storage environment.

2. Description of the Related Art

Log data generated from microcodes of a hierarchical storage management (HSM) system, typified by a virtual tape server (VTS) or the like, is stored in a hard disk which is the system's primary cache. The primary cache, however, is generally limited in storage area in comparison with the secondary cache. Therefore, the amount of log data which can be left is limited, and usually the old log data is overwritten as new log data is logged or written into storage. In addition, such log data is less important than user data, or other data, and therefore it is difficult to secure a large size for the primary cache as a storage area for logging. However, if a problem occurs at a customer's office, the problem analysis is performed on the basis of the logged data that is stored and any extremely old log data may be necessary for proper analysis to solve the particular problem. Older logged data, however, often times is lost after overwriting (wrapping) with newer logged data, making it difficult to perform the problem analysis.

SUMMARY OF THE INVENTION

In view of the current state of the art, a need exists for saving log data in a hierarchical storage management (HSM) system using a disk system as a primary cache with a tape library as a secondary cache in a computing storage environment. In a hierarchical storage environment, for example, a virtual tape server (VTS) uses a disk system as the primary cache with a tape library as the secondary cache on the back end for storage on real or virtual tape cartridges (tape). User data is stored first in the disk system and then moved to a tape cartridge at an appropriate timing. In this operation, a sufficient number of blank tapes are prepared in the tape library and are unused until user data is actually written into the tapes. In wrapping of the microcode log stored in the primary cache, the VTS microcode log is copied into the blank tape. Since the tape in which the log is written still looks like a blank tape to the user, the tape is likely to be used eventually. Thus, the log data is reserved for a longer period of time by causing the tape containing the written or stored logged data to be selected at the latest possible time for writing user data. In addition, the blank tapes are not limited to a microcode debug log, but various histories of the entire VTS such as a system load status and event information can be left as much as possible. Thus, log data having many histories can be left in comparison with a case where log data is stored only in the disk system. Moreover, this does not cause any load on the user and log data is preserved as long as possible.

Accordingly, in view of the foregoing and to achieve the benefits in the previous summary, various embodiments are provided for saving log data in a hierarchical storage management (HSM) system using a disk system as a primary cache with a tape library as a secondary cache in a computing storage environment. In one embodiment, by way of example only, the user data is stored in the primary cache, the user data being written from the primary cache into the secondary cache at a subsequent period of time. Blank tapes are prepared in the secondary cache for storing the user data and the log data based on priorities, the blank tapes are unused until the user data is written to the tape library. A blank tape is selected for copying the log data and the user data from the primary cache to the secondary cache based upon priorities. The log data is stored in the primary cache, wherein the plurality of log data is wrapped in the primary cache and a copy of the plurality of microcode log data being copied into the plurality of blank tapes, the plurality of blank tapes being configured to appear blank to a user for storing the user data. The selection of at least one of the plurality of blank tapes completely filled with the plurality of log data is delayed for writing additional amounts of the user data. The plurality of log data in at least one of the plurality of blank tapes completely filled with the plurality of log data is preserved for an extended period of time.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
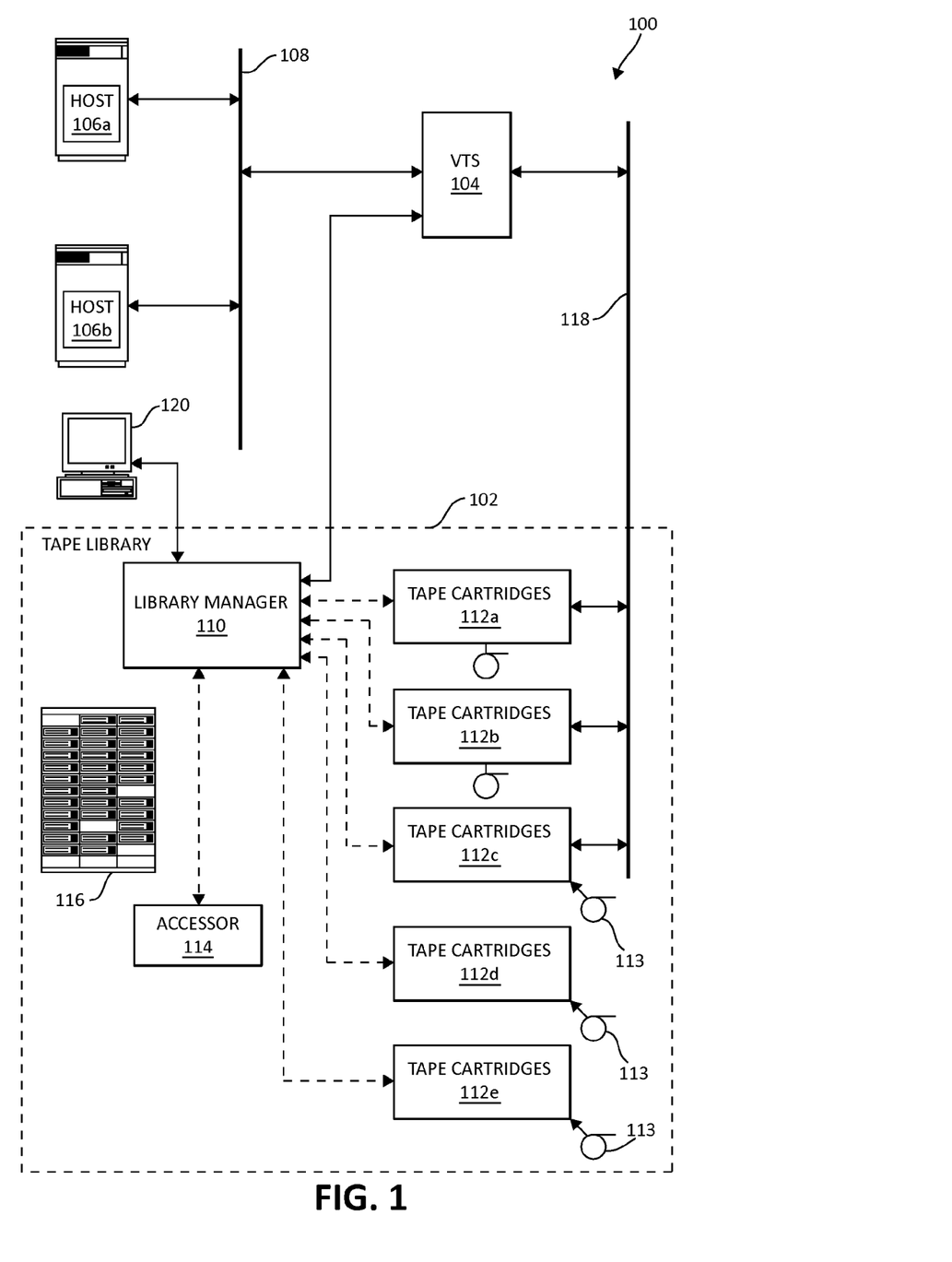
FIG. 1 illustrates an exemplary embodiment of a representative virtual tape system.

FIG. 1 illustrates an exemplary embodiment of a representative virtual tape system 100, in accordance with the present invention. The system 100 includes a tape library 102, at least one VTS 104 (primary cache), and at least one host 106 (shown as 106a and 106b). Each host 106 may be a mainframe computer. Alternatively, the host (users) 106 may be servers or personal computers using a variety of operating systems. The host 106 and the VTS 104 are connected via a storage area network (SAN) 108 or another suitable communications channel, for example, an Enterprise System Connection (ESCON) channel used in IBM mainframe computers.

The tape library 102 may include a library manager 110, one or more data drive devices, which may be tape cartridges 112 (secondary cache shown as 112a-e), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The configuration of the library manager 110 will be shown and described in greater detail below. The mechanisms of the illustrated embodiments use two types of cache, a primary cache (VTS 104) and a secondary cache (tape cartridges, 350 in FIG. 3) in the hierarchical storage management (HSM) system. Such configuration allows the VTS 104 to present to the user or host 106 a file on the disk cache (308, in FIG. 3) as if it were a virtual tape and the user writes or reads data to or from the file. The file, as the virtual tape generated by the host, is later migrated to a real tape (tape cartridges, 350 in FIG. 3) at an appropriate time. However, the mechanisms of the illustrated embodiments may provide for the real tape or tape cartridges (350 in FIG. 3) to be real or virtual.

In FIG. 1, five tape cartridges 112a, 112b, 112c, 112d, and 112e are shown. The present invention is operable with one or more tape drives 113. The tape drives 113 are configured for assisting with the mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network, (SAN), local area network (LAN), wide area network (WAN), or another suitable type of network, including the Internet or a direct connection between the VTS 104 and the tape cartridges 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system, mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106.

In addition, the described exemplary embodiment may be implemented by various means, such as hardware, software, firmware, or a combination thereof operational on or otherwise associated with the computing environment. For example, the method 100, as well as the following illustrated exemplary methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Figure 2:
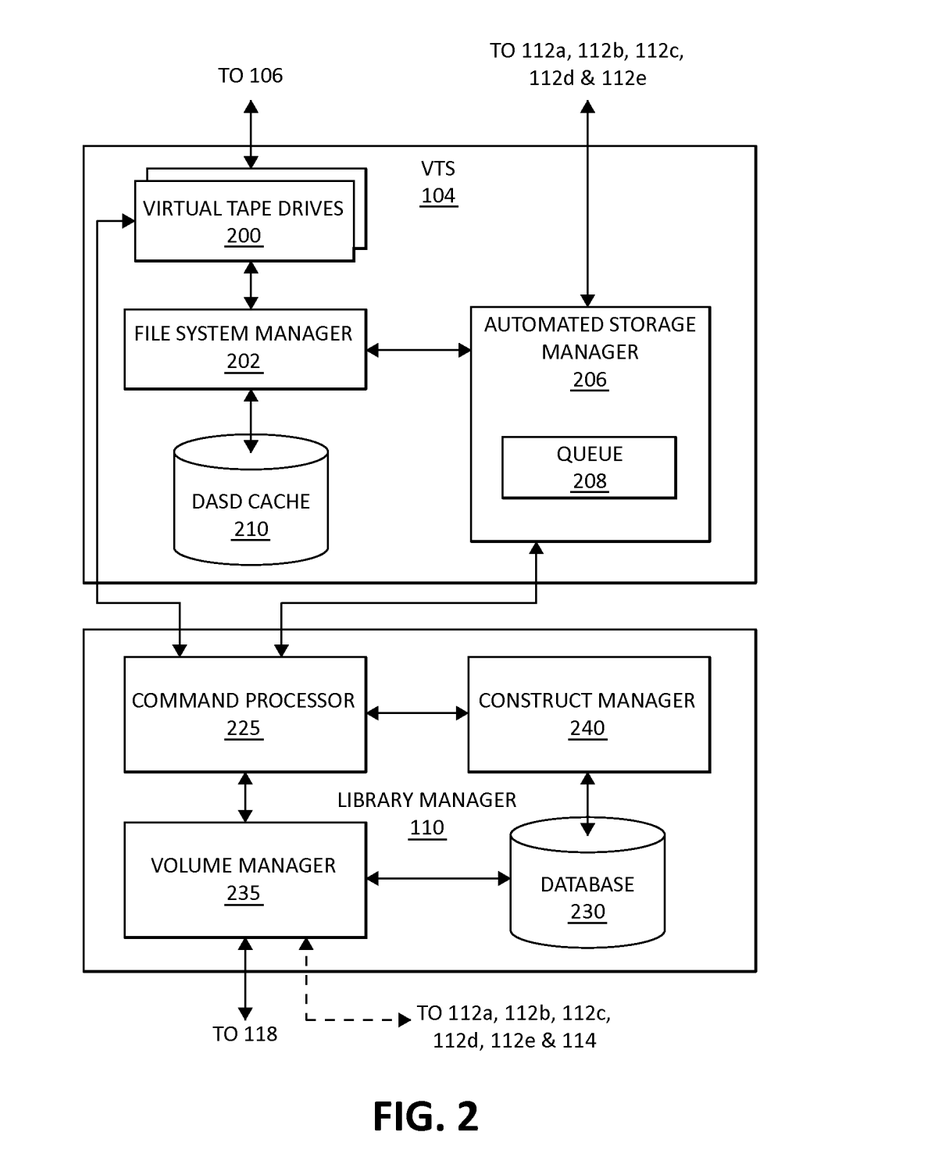
FIG. 2 illustrates an exemplary embodiment of the VTS and library manager.

FIG. 2 illustrates a schematic block diagram depicting one embodiment of the VTS 104 and one embodiment of the library manager 110 of FIG. 1. The VTS 104 and the library manager 110 may each take the form of a computer with a bus, processor, memory, and the like. These elements have been omitted from FIG. 2 to more clearly depict the various executable modules and data blocks of the VTS 104 and the library manager 110 pertinent to the invention. There could also be other executable modules and data blocks known in the art in implementing a VTS 104 or library manager 110, but are omitted to focus on the elements essential to the invention.

As shown, the VTS 104 includes a plurality of virtual tape drives 200, a file system manager 202, an automated storage manager 206, a queue 208, and at least one direct access storage device (DASD) cache 210. The DASD cache 210 temporarily stores data from the host 106 on virtual or logical volumes in the form of files, and may thus be referred to as a primary cache. A write command from the host 106 is processed by the VTS 104, through a virtual tape drive 200 into the DASD cache 210, prior to transferring the updated logical volume from the DASD cache 210 to the mountable media or physical volume 116 (FIG. 1). According to one example, the DASD cache 210 takes the form of one or more hard disk drives, which may be arranged in a redundant array of independent drives (RAID configuration), such as RAID 5. The virtual tape drives 200 also process control commands from host 106.

The file system manager 202 manages and coordinates data storage in the DASD cache 210. The automated storage manager 206 controls the interface communications between the file system manager 202 and the tape cartridges 112. The automated storage manager 206 also controls communications between the VTS 104 and the library manager 110. In one embodiment, the host 106 may request a particular logical volume. The automated storage manager 206 determines whether the logical volume is in the DASD cache 210. If it is not, the automated storage manager 206 requests a recall for it from the physical volume or mountable media 116. The automated storage manage 206 may also contain a queue 208 for temporarily placing additional recall requests to be processed. Thus, the automated storage manager 206 is an apparatus for recalling logical volumes from mountable media 116 by means of the tape drives 112 a, b, c, d, and e (FIG. 1).

The library manager 110 manages the virtual and physical volumes as well as the constructs. More specifically, the library manager 110 includes the command processor 225 that receives control commands from the virtual tape drives 200 and the automated storage manager 206. The command processor 225 passes instructions about the management of the virtual and physical volumes to the volume manager 235. The volume manager 235 stores information about the virtual and physical volumes on a database 230 of the library manager 110. In addition, depending on the instructions received, the volume manager sends instructions to the tape cartridges 112 and/or the accessor 114 to load or "mount" the cartridges or other mountable media 116 on which copies of the virtual volume are to be made or retrieved. Mounting of multiple cartridges 116 may be generally simultaneous or in a certain order, depending on the configuration of the accessor 114 and the tape cartridges 112.

The library manager 110 also has a construct manager 240 that receives user instructions from the control console 120 regarding the volume management actions to be followed for a given construct name. The volume management actions are stored and retrieved by the construct manager 240 on a database 230 of the library manager 110. For certain control commands received by the command processor 225, the command processor 225 instructs the construct manager 240 to provide the volume management actions for a specific virtual volume. The command processor 225 then passes the returned volume management actions for a specific virtual volume to the automated storage manager 206.

Figure 3A:
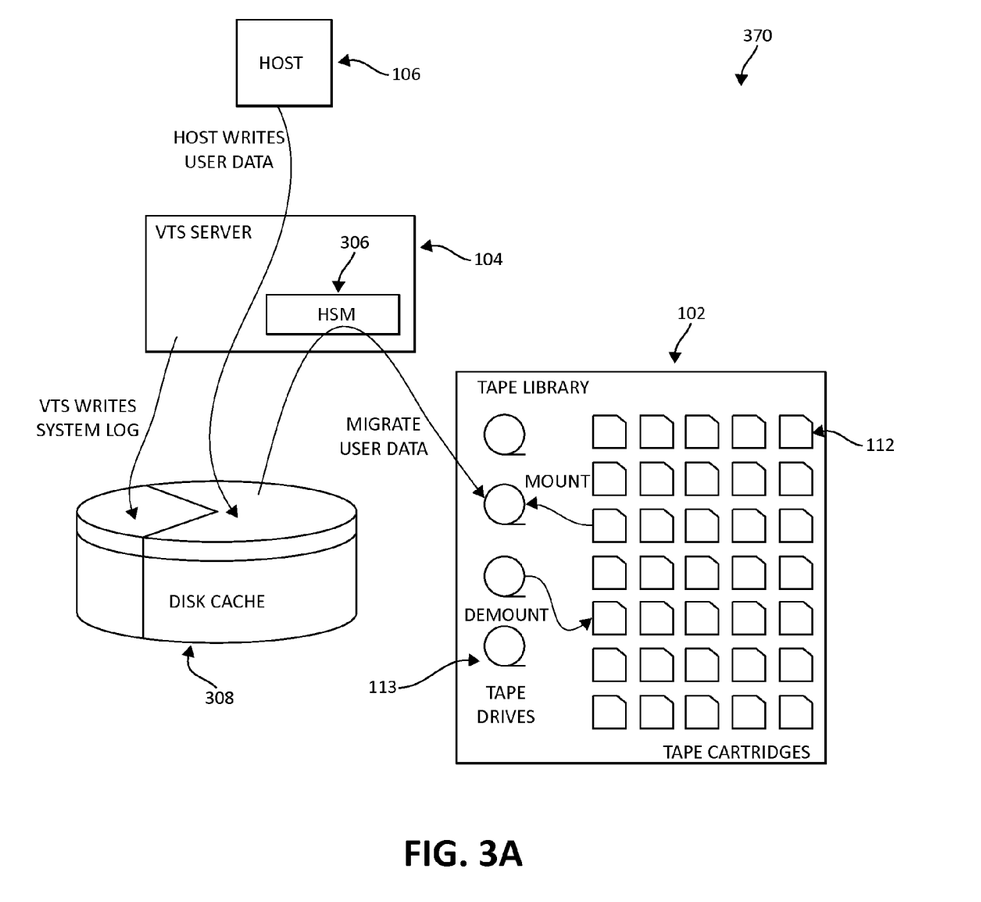
FIG. 3A illustrates exemplary embodiment for logging data from the VTS to the tape library.

Turning now to FIG. 3A, an exemplary embodiment 370 of the VTS 104 and one embodiment of the tape library for logging data from the VTS to tape library 102 of FIG. 1. The present invention includes the use of two types of cache in the hierarchical storage management (HSM) 306 systems. There could also be other executable modules and data blocks known in the art in implementing a VTS 104 or tape library 110, but are omitted to focus on the elements essential to the invention. In one embodiment, the exemplary embodiment 370 may be implemented using various processing, networking, and storage components in computing environments.

Figure 3B:
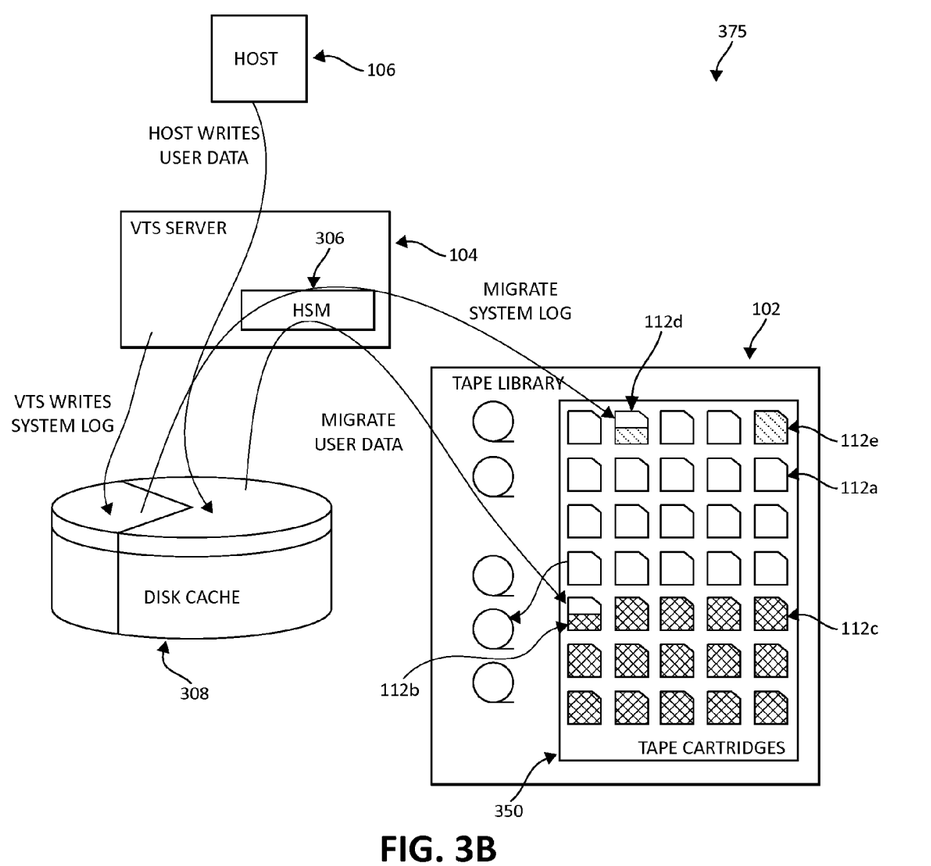
FIG. 3B illustrates an exemplary embodiment for logging data from the YTS to tape cartridges.

The VTS 104 presents to the host (user) 106 a file on the disk cache 308 as if it were a virtual tape and the host 106 writes or reads data to or from the file. The file as the virtual tape generated by the host 106 is later migrated to the tape drives 113 or tape cartridges 350 of tape library 102 at an appropriate time. (The mechanisms of the illustrated embodiments provided in FIG. 3 are further explained in FIG. 3B) The present invention is operable with one or more tape drives 113. The tape drives 113 are configured for assisting with the mounting and demounting user data and log data to and from the tape cartridges (tape media) 112.

Turning now to FIG. 3B, an exemplary embodiment 375 of the VTS 104 and one embodiment of the tape library for logging data from the VTS 104 (FIG. 1) to tape cartridges 350. As mentioned in FIG. 3A, the present invention includes the use of two types of cache in the hierarchical storage management (HSM) 306 system. There could also be other executable modules and data blocks known in the art in implementing a VTS 104 or tape library 102, but are omitted to focus on the elements essential to the invention. In one embodiment, the exemplary embodiment 375 may be implemented using various processing, networking, and storage components in computing environments.

The mechanisms of the illustrated embodiments are such that during the system operation, the tape cartridges 350 (real or virtual tapes) of the tape library 102 will normally transits three types of states. The three types of states include: blank tapes 112a in which no data is written, halfway written tapes 112b in which data is written halfway of the tape library, and completely written tapes 112c in which data is written up to the end of the tape cartridge in the tape library. When the user data file on the disk cache 308 is migrated to the tape cartridges 350 of the tape library 102, the destination tape cartridge 112 is selected by the following priorities: halfway written tapes 112b and blank tapes 112a. As will be explained later, the tape cartridge is blank tape with log data written halfway 112d and 112e is a blank tape with completely written and filled with log data. A host 106 generally prepares a sufficient number of blank tapes 112a and replenishes new tapes or tape cartridges 350 in the tape library 102 in case of running out of blank tapes 112a. Therefore, the host 106 hardly uses up all of the blank tapes 112a. In the present invention, the blank tapes 112a are used to store old microcode log and log data indicating system load statuses. Generally speaking, while a blank tape in which a log file is written may look like a normal blank tape 112a to the user, the tape is further classified into the following three types in the system: a blank tape with no log data 112a where no data is written, blank tape with log data written halfway 112d in which log data is written halfway, and a blank tape with log data written completely 112e, which is completely filled with log data. The present invention is operable with one or more tape drives 113. The tape drives 113 are configured for assisting with the mounting and demounting user data and log data to and from the tape cartridges 112.

In one aspect of the illustrated embodiments, log data is moved from the disk cache 308 (primary cache) to the tape library 102 (secondary cache) in a procedural order. First, the size of log data or the like on the disk cache 308 exceeds a certain threshold. Second, one of the tape cartridges 350, containing the various types of blank cartridges 112, is selected by the priorities described below. Third, the log data is written into the tape cartridges 350 selected in step. Finally, the processing returns to the first step, as previously mentioned.

The threshold in the above first step is assumed to be determined as described below in FIG. 4. The timing at which the log data is moved to the tape library 102 is when the log data on the disk cache 308 reaches a certain threshold amount. Although the log data area on the disk cache 308 is used with wrapping, as is conventional, a threshold value is determined so that data can be moved before the data is overwritten by wrapping. In addition, one tape drive 113 is used to write log data into one of the tape cartridges 350, and thus, one tape drive 113 used for the user data migration is temporarily occupied. Therefore, it is necessary to reduce as low as possible the frequency of writing the log data into the tape library 102.

Figure 4:
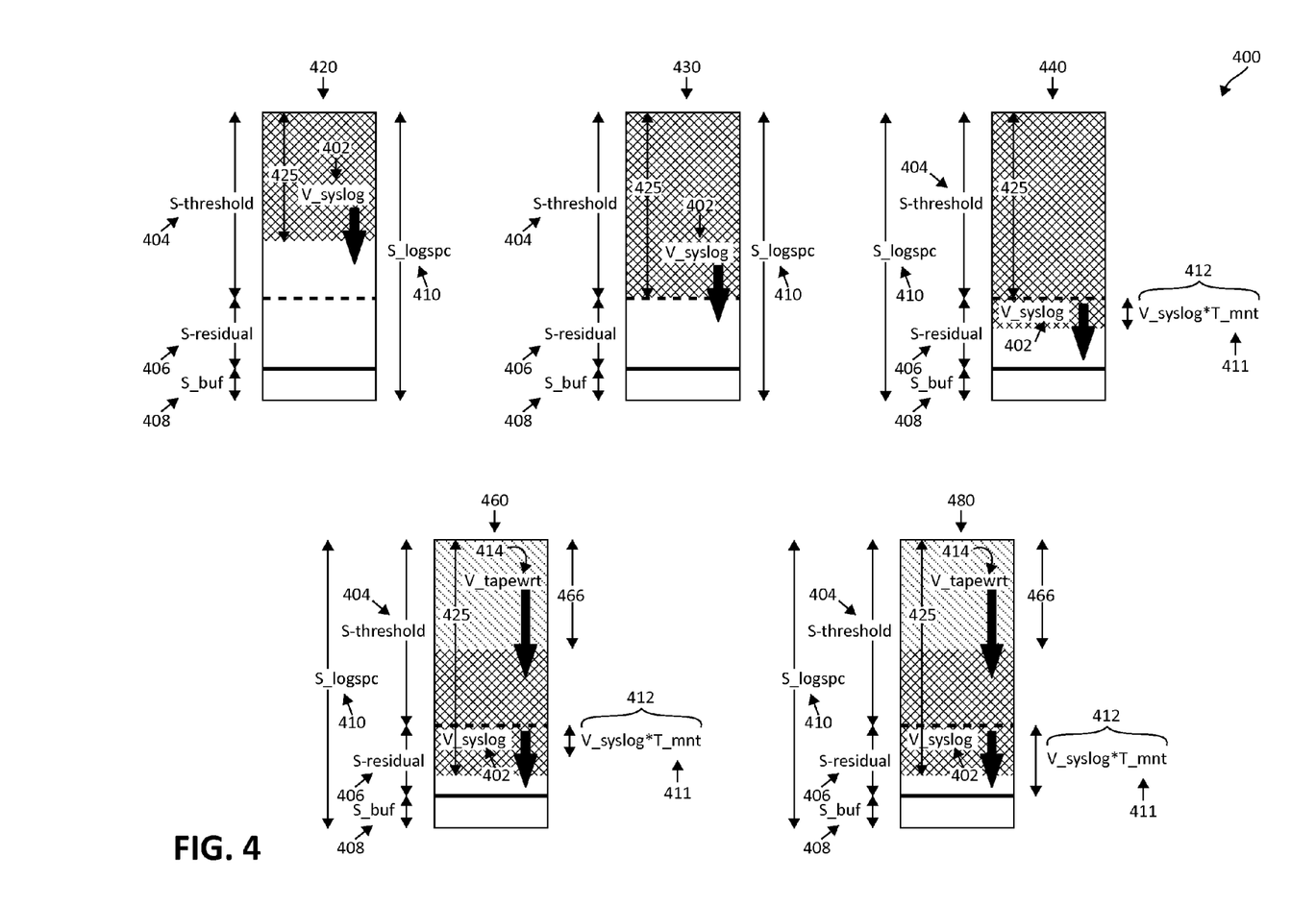
FIG. 4 illustrates an exemplary functionality of the threshold value for migrating log data.

Turning now to FIG. 4, exemplary functionality 400 of the threshold for migrating log data, as previously described is illustrated. The exemplary functionality 400 includes 5 blocks; block 420, block 430, block 440, block 460, and block 480. Within each block are values illustrating the functionality of the threshold for determining when to write the log data. S_log spc 410 is the size of the log data area in which log data can be written on the disk cache. S_threshold 404 is the threshold value used to determine when to write data, as previously described in FIG. 3, S_buf 408 is a spare area prepared for an unexpected occurrence. S_residual 406 is the amount of log data that can be written into the log data area after log data reaches the threshold, and V_sys log 402 is the amount of log data output per unit time from the system. The write area 425 is the area in which the log data is written. T_mnt 411 is the time required for moving the tape cartridge 112 to the tape drive 113 (FIG. 3A), mounting the tape, and locating the start of the log data on the tape cartridge 112, the amount of log output from the system during the time T_mnt is V_sys log*T_mnt 412.

In one of the illustrated embodiments, blocks 420 and 430 illustrate the write area 425 where the log data is written. S_log spc 410 is the size of the log data area in which log data can be written on the disk cache. S_threshold 404 is the threshold as previously described in FIG. 3, S_buf 408 is a spare area prepared for an unexpected occurrence. S_residual 406 is the amount of log data that can be written into the log data area after log data reaches the threshold and V_sys log 402 is the amount of log data output per unit time from the system. The write area 425 is the area in which the log data is written. The log data of the S_threshold 404 amount is written into the tape cartridge 112 when the log reaches S_threshold 404 as illustrated by the dotted line inside of the block 420.

In reference to block 420, the S_threshold 404 has not yet reached the S_threshold 404 limit as represented by the dotted line in the write area 425. The write area 425 is the area in which the log data is written. As the write area 425 reaches the S_threshold 404 limit, as illustrated in block 430, the amount of log data in the write area 425 starts to be written into the tape library (102 of FIG. 1). The mechanisms of the illustrated embodiments continue to output the log data while the log data of the S_threshold 404 amount is written into on of the tape library (102 of FIG. 1), as seen in block 440. The S_log spc 410 is the size of the log data area in which log data can be written on the disk cache. S_threshold 404 is the threshold, as previously described in FIG. 3. S_buf 408 is a spare area prepared for an unexpected occurrence. S_residual 406 is the amount of log data that can be written into the log data area after log data reaches the threshold and V_sys log 402 is the amount of log data output per unit time from the system. A time period is represented by T_mnt 411 and is the time period required for moving the virtual tape 104 to the tape library (102 of FIG. 1), tape drives (113 of FIG. 3), mounting the tape, and locating the start of the log data on the tape. Moreover, the amount of log data output occurring during the time T_mnt is represented by the equation V_sys log*T_mnt 412.

In reference to Block 460, when the log data of the S_threshold 404 amount commences to write the log data into the tape library (102 of FIG. 1), a written portion 466 is represented as a portion of the log data that has been written into the tape library (102, FIG. 1). The writing speed at which the log data is written to the tape library (102, FIG. 1) is shown by V_tapewrt 414.

The exemplary functionality 400 as described previously, is demonstrated through a series of equations. Ideally, when the log of the S_threshold 404 amount is completely written to the tape library (102, FIG. 1), the amount of new log output from the system or host (106, FIG. 1) is equal to the S_residual 406 amount. Therefore, the S_threshold value is obtained so as to achieve the S_residual 406 amount. The total time (T_log mig) required to write the log of the S_threshold 404 amount into the tape library (102, FIG. 1) is shown by:

$$T\_log\ mig = T\_mnt + S\_threshold/V\_tapewrt \quad (1),$$

where T_mnt 411 is the time required for moving the tape cartridge 112 to the tape drive 113, mounting the tape, locating the start of the log data on the tape cartridge 112, the S_threshold is the threshold value, and V_tapewrt writing speed at which the log data is written to the tape library.

The amount of log output from the system or host (106, FIG. 1) during this time is required to be equal to the S_residual 406 value, and is defined by:

$$S\_residual = V\_sys\ log * T\_log\ mig = V\_sys\ log * (T\_mnt + S\_threshold/V\_tapewrt) \quad (2)$$

where S_residual 406 is the amount of log data that can be written into the log data area after log data reaches the threshold, V_sys log 402 is the amount of log data output per unit time from the system, T_log mig is the total time required to write the log of the S_threshold 404 amount into the tape library, V_sys log 402 is the amount of log data output per unit time from the system, T_mnt 411 is the time required for moving the tape cartridge 112 to the tape drive 113, mounting the tape, and locating the start of the log data on the tape cartridge 112, S_threshold is the threshold value, and V_tapewrt writing speed at which the log data is written to the tape library.

The following equation is satisfied when defined and shown as:

$$S\_residual = S\_log\ spc - S\_buf - S\_threshold \quad (3)$$

where S_residual 406 is the amount of log data that can be written into the log data area after log data reaches the threshold, S_log spc 410 is the size of the log data area in which log data can be written on the disk cache, the S_buf 408 value is a spare area prepared for an unexpected occurrence, S_threshold is the threshold value, and V_tapewrt writing speed at which the log data is written to the tape library Because of equation (2) and (3), the following equations holds true as defined and shown by:

$$S\_log\ spc - S\_buf - S\_threshold = V\_sys\ log * (T\_mnt + S\_threshold/V\_tapewrt) \quad (4)$$

where S_log spc 410 is the size of the log data area in which log data can be written on the disk cache, the S_buf 408 value is a spare area prepared for an unexpected occurrence, S_threshold is the threshold value, V_sys log 402 is the amount of log data output per unit time from the system, T_mnt 411 is the time required for moving the tape cartridge 112 to the tape drive 113, mounting the tape, locating the start of the log data on the tape cartridge 112, and V_tapewrt writing speed at which the log data is written to the tape library.

If the S_threshold 404 value is calculated based on the above equation, the threshold value is determined by solving the following equation to obtain the equation defined and shown by:

$$S\_threshold = (S\_log\ spc - S\_buf - T\_mnt * V\_sys\ log)/(1 + V\_sys\ log/V\_tapewrt) \quad (5)$$

where S_threshold is the threshold value, S_log spc 410 is the size of the log data area in which log data can be written on the disk cache, the S_buf 408 value is a spare area prepared for an unexpected occurrence, V_sys log 402 is the amount of log data output per unit time from the system, T_mnt 411 is the time required for moving the tape cartridge 112 to the tape drive 113, mounting the tape, locating the start of the log data on the tape cartridge 112, and V_tapewrt writing speed at which the log data is written to the tape library.

Generally, V_sys log 402 is sufficiently lower than V_tapewrt 414, and therefore, if the following equation shown by:

$$V\_sys\ log/V\_tapewrt \approx 0 \quad (6)$$

where V_sys log 402 is the amount of log data output per unit time from the system and V_tapewrt writing speed at which the log data is written to the tape library, than the following is satisfied shown and defined by:

$$S\_threshold \approx S\_log\ spc - S\_buf - T\_mnt * V\_sys\ log \quad (7)$$

Where S_threshold is the threshold value, S_log spc 410 is the size of the log data area in which log data can be written on the disk cache, the S_buf 408 value is a spare area prepared for an unexpected occurrence, V_sys log 402 is the amount of log data output per unit time from the system, and T_mnt 411 is the time required for moving the tape cartridge 112 to the tape drive 113, mounting the tape, and locating the start of the log data on the tape cartridge 112.

Therefore, as illustrated in block 480, the equation S_threshold≈S_log spc−S_buf−T_mnt*V_sys log (7) is an approximation where writing the data to the tape library (102, FIG. 1) corresponds to moving the tape cartridge 112, mounting the tape cartridge 112, and locating the start of the log data on the tape cartridge 112. Also, the equation for determining the S_threshold 404, S_log spc 410, S_buf 408, V_tapewrt 414, and T_mnt 411 can be derived from a specification, though V_sys log 402 is likely to vary according to the system operating condition. If the actual log data output speed is continuously measured and V_realsys log, which is the measured value as a time function, the following V_sys log determination method may be obtained. The V_realsys log obtained immediately before the log data reaches the S_threshold 404 value is assumed to be V_sys log 402. In the VTS (104, FIG. 1), a variety of actions may be performed in a one-day cycle. For example, the user data may be stored in the daytime while the backend maintenance process may be mainly performed during the nighttime. Therefore, V_realsys log may be stored for each hour in a day and V_realsys log may be stored at the time when the log data reaches the S_threshold 404 value that is assumed to be V_sys log.

Figure 5:
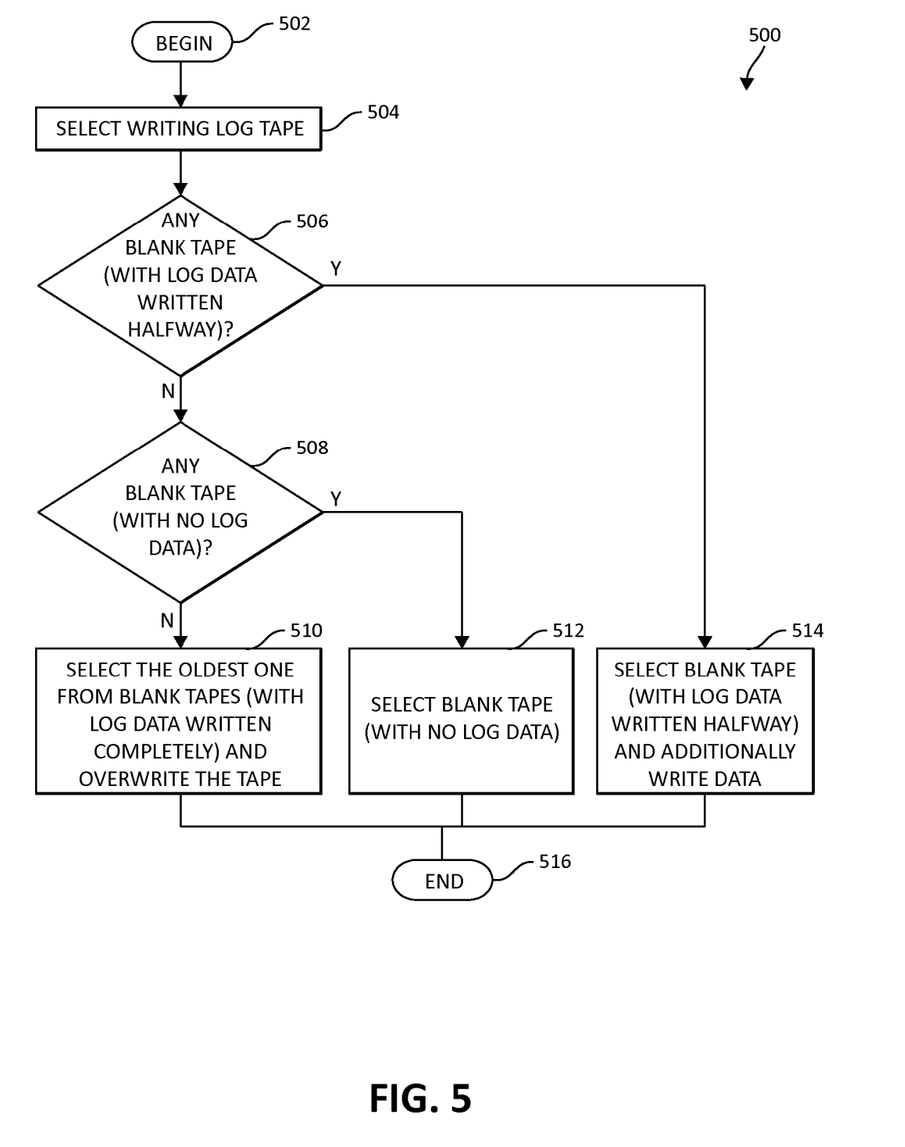
FIG. 5 illustrates an exemplary method for moving log data from the primary cache to the secondary cache.

FIG. 5, following, illustrates an exemplary method 500 for moving log data from the primary cache to the secondary cache with the foregoing discussion in mind. Method 500 begins (step 502), by selecting the appropriate tape cartridge for writing the log data (step 504). If any blank tapes with log data written half way are present (step 506) the method 500 will select the blank tape with log data written halfway and write the additional log data (step 514). If no blank tapes with log data written half way are found (step 506) the method 500 will check to see if any blank tape with no log data are present (step 508). If a blank tape with no log data is found, the method 500 will select the blank tape with no log data and write the log data (step 512). However, if no blank tape with no log data exists, the method 500 will select the oldest blank tape with log data written completely and overwrite the tape cartridge (step 510). The method ends (step 516).

Figure 6:
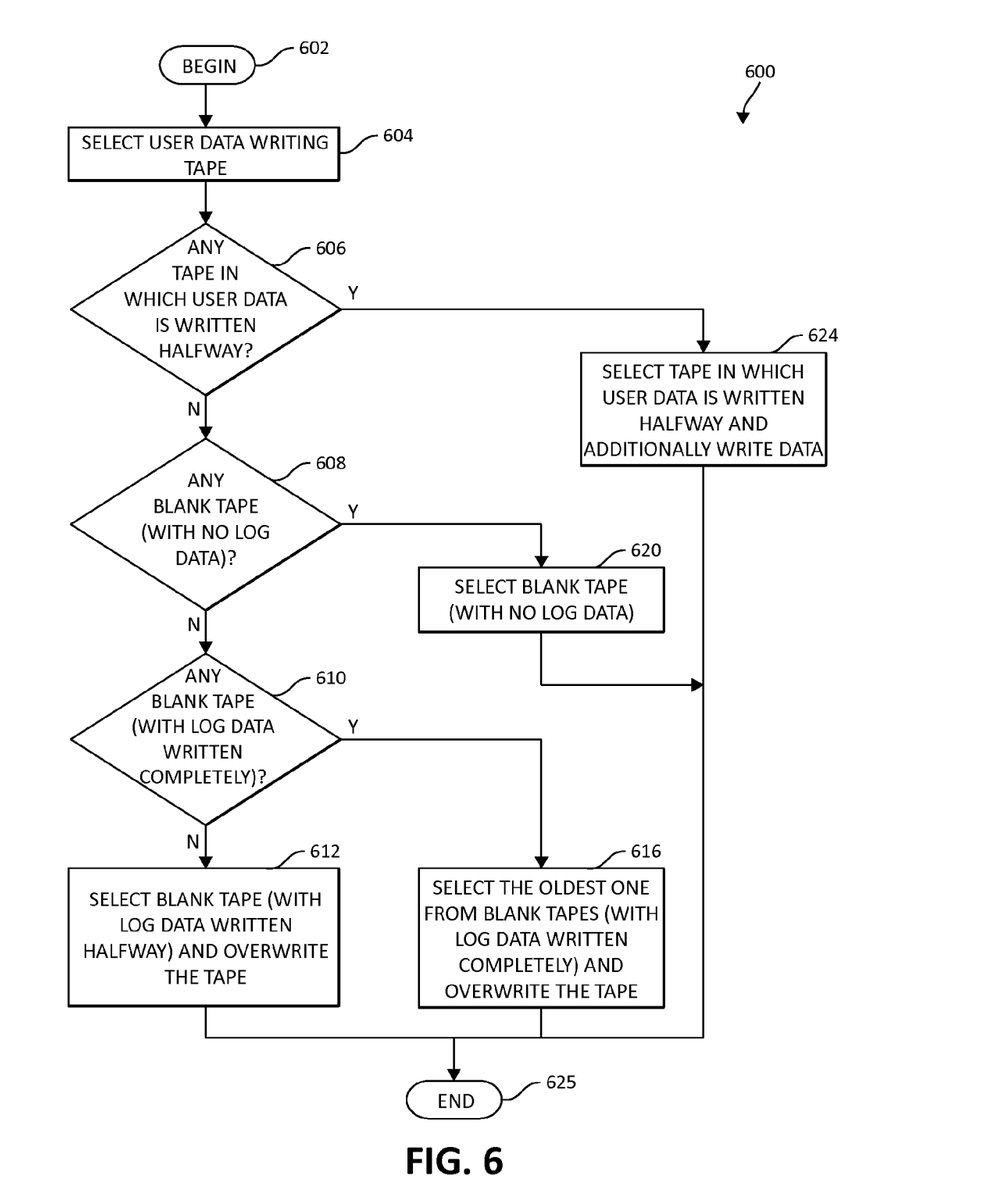
FIG. 6 illustrates exemplary method for moving user data from the primary cache to the secondary cache.

FIG. 6, following, illustrates an exemplary method 600 for moving a file with user data from the primary cache to the secondary cache with the foregoing discussion in mind. Method 600 begins (step 602), by selecting the appropriate tape cartridge for writing the user data (step 604). If any blank tapes with user data written half way are present (step 606) the method 600 will select the blank tape with user data written halfway and write the additional user data (step 624). If no blank tapes with user data written half way are present (step 606) the method 600 will check to see if any blank tape with no log data is present (step 608). If a blank tape with no log data is found, the method 600 will select the blank tape with no log data and write the user data (step 620). However, if no blank tape with no log data exists, the method 600 will determine if any blank tape with log data written completely exists (step 610). If so, the method 600 will select the oldest blank tape with log data written completely filled and overwrite the tape cartridge (step 616). If no blank tape with no log data exists, the method 600 will select a blank tape with log data written halfway and overwrite the tape cartridge (step 612). The method ends (step 625). Thus, the log data having many histories can be left blank tapes as compared with situations where log data is stored only in the disk system (primary cache) and thus reducing the load on the host/user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system, for saving a plurality of log data in a hierarchical storage management (HSM) system using a disk system as a primary cache with a tape library as a secondary cache, comprising:
   at least one tape drive; and
   at least one processor device, operable with the at least one tape drive, wherein the at least one processor device:
      stores user data in the primary cache, the user data being written from the primary cache into the secondary cache at a subsequent period of time,
      prepares a plurality of blank tapes in the secondary cache for storing the user data and the plurality of log data based on a plurality of priorities, the plurality of blank tapes are unused until the user data is written to at least one tape media,
      selects at least one of the plurality of blank tapes for copying the plurality of log data and the user data from the primary cache to the secondary cache based upon the plurality of priorities, and
      stores the plurality of log data in the primary cache, wherein the plurality of log data is wrapped in the primary cache and a copy of the plurality of log data being copied into the plurality of blank tapes, the plurality of blank tapes being configured to appear blank to a user for storing the user data.

2. The system of claim 1, wherein the at least one processor device delays the selection of at least one of the plurality of blank tapes, completely filled with the plurality of log data, for writing additional amounts of the user data, wherein the plurality of log data in at least one of the plurality of blank tapes completely filled with the plurality of log data is preserved for an extended period.

3. The system of claim 1, wherein the at least one processor device determines a threshold value to allow the plurality of log data to be copied from the primary cache to the secondary cache prior to wrapping the plurality of log data.

4. The system of claim 1, wherein the at least one processor device copies the plurality of log data from the primary cache to the secondary cache when the size of the plurality of log data on the primary cache exceeds a threshold value.

5. The system of claim 1, wherein the at least one processor device selects at least one of the plurality of blank tapes for copying the plurality of log data from the primary cache to the secondary cache based upon the plurality of priorities includes performing at least one of:
   if the secondary cache contains at least one of the plurality of blank tapes partially filled with the plurality of log data, selecting the at least one of the plurality of blank tapes partially filled with the plurality of log data,
   if the secondary cache contains at least one of the plurality of blank tapes without the plurality of log data, selecting the at least one of the plurality of blank tapes without the plurality of log data, and
   if the secondary cache contains at least one of the plurality of blank tapes completely filled with the plurality of log data, selecting an oldest one of the at least one of the plurality of blank tapes completely filled with the plurality of log data and overwriting the plurality of log data.

6. The system of claim 1, wherein the at least one processor device selects at least one of the plurality of blank tapes for copying the user data from the primary cache to the secondary cache based upon the plurality of priorities includes performing at least one of:
   if the secondary cache contains at least one of the plurality of blank tapes partially filled with the user data, selecting the at least one of the plurality of blank tapes partially filled with the plurality of log data,
   if the secondary cache contains at least one of the plurality of blank tapes without the plurality of log data, selecting the at least one of the plurality of blank tapes without the plurality of log data,
   if the secondary cache contains at least one blank tape completely filled with the plurality of log data, selecting the oldest one of the at least one of the plurality of blank tapes completely filled with the plurality of log data and overwriting the plurality of log data with the user data, and
   if the secondary cache contains at least one blank tape without the plurality of log data, selecting the oldest one of the at least one of the plurality of blank tapes partially filled with the plurality of log data and overwriting the plurality of log data.

7. The system of claim 1, wherein the at least one processor device prepares the plurality of blank tapes in the secondary cache for storing the user data and the plurality of log data by the plurality of priorities including performing at least one of:
   replenishing the secondary cache with an additional amount of the plurality of blank tapes, and
   for each of the plurality of priorities, adapting the plurality of blank tapes to operate in a plurality of states.

8. A computer program product, for saving a plurality of log data in a hierarchical storage management (HSM) system using a disk system as a primary cache with a tape library as a secondary cache by a processor device, the computer program product comprising a non-transitory computer-readable storage medium having computer-readable program code portions stored therein, the computer-readable program code portions comprising:

a first executable portion for, storing user data in the primary cache, the user data being written from the primary cache into the secondary cache at a subsequent period of time;

a second executable portion for, preparing a plurality of blank tapes in the secondary cache for storing the user data and the plurality of log data based on a plurality of priorities, the plurality of blank tapes are unused until the user data is written to at least one tape media;

a third executable portion for, selecting at least one of the plurality of blank tapes for copying the plurality of log data and the user data from the primary cache to the secondary cache based upon the plurality of priorities; and a fourth executable portion for, storing the plurality of log data in the primary cache, wherein the plurality of log data is wrapped in the primary cache and a copy of the plurality of microcode log data being copied into the plurality of blank tapes, the plurality of blank tapes being configured to appear blank to a user for storing the user data.

9. The computer program product of claim 8, further including a fifth executable portion a fifth executable portion that delays the selection of at least one of the plurality of blank tapes, completely filled with the plurality of log data, for writing additional amounts of the user data, wherein the plurality of log data in at least one of the plurality of blank tapes completely filled with the plurality of log data is preserved for an extended period.

10. The computer program product of claim 8, further including a fifth executable portion that determines a threshold value to allow the plurality of log data to be copied from the primary cache to the secondary cache prior to wrapping the plurality of log data.

11. The computer program product of claim 8, further including a fifth executable portion that copies the plurality of log data from the primary cache to the secondary cache when the size of the plurality of log data on the primary cache exceeds a threshold value.

12. The computer program product of claim 8, further including a fifth executable portion that selects at least one of the plurality of blank tapes for copying the plurality of log data from the primary cache to the secondary cache based upon the plurality of priorities includes performing at least one of:

if the secondary cache contains at least one of the plurality of blank tapes partially filled with the plurality of log data, selecting the at least one of the plurality of blank tapes partially filled with the plurality of log data, if the secondary cache contains at least one of the plurality of blank tapes without the plurality of log data, selecting the at least one of the plurality of blank tapes without the plurality of log data, and if the secondary cache contains at least one of the plurality of blank tapes completely filled with the plurality of log data, selecting an oldest one of the at least one of the plurality of blank tapes completely filled with the plurality of log data and overwriting the plurality of log data.

13. The computer program product of claim 8, further including a fifth executable portion that selects at least one of the plurality of blank tapes for copying the user data from the primary cache to the secondary cache based upon the plurality of priorities includes performing at least one of:

if the secondary cache contains at least one of the plurality of blank tapes partially filled with the user data, selecting the at least one of the plurality of blank tapes partially filled with the plurality of log data, if the secondary cache contains at least one of the plurality of blank tapes without the plurality of log data, selecting the at least one of the plurality of blank tapes without the plurality of log data, if the secondary cache contains at least one blank tape completely filled with the plurality of log data, selecting the oldest one of the at least one of the plurality of blank tapes completely filled with the plurality of log data and overwriting the plurality of log data with the user data, and if the secondary cache contains at least one blank tape without the plurality of log data, selecting the oldest one of the at least one of the plurality of blank tapes partially filled with the plurality of log data and overwriting the plurality of log data.

14. The computer program product of claim 8, further including a fifth executable portion that prepares the plurality of blank tapes in the secondary cache for storing the user data and the plurality of log data by the plurality of priorities including performing at least one of:

replenishing the secondary cache with an additional amount of the plurality of blank tapes, and for each of the plurality of priorities, adapting the plurality of blank tapes to operate in a plurality of states.

* * * * *